(12) United States Patent
Dijon et al.

(10) Patent No.: US 8,864,370 B2
(45) Date of Patent: Oct. 21, 2014

(54) ICE BREAKING PROBE FOR MEASURING GLOBAL AIR TEMPERATURE

(75) Inventors: Sebastien Dijon, Corquoy (FR); David Lapeyronnie, Bourges (FR); Bruno Lhuillier, Les Bordes (FR)

(73) Assignee: Auxitrol S.A., Bourges (FR)

( * ) Notice: Subject to any disclaimer, the term of this patent is extended or adjusted under 35 U.S.C. 154(b) by 0 days.

(21) Appl. No.: 13/580,960

(22) PCT Filed: Feb. 23, 2011

(86) PCT No.: PCT/EP2011/052701
§ 371 (c)(1),
(2), (4) Date: Oct. 4, 2012

(87) PCT Pub. No.: WO2011/104286
PCT Pub. Date: Sep. 1, 2011

(65) Prior Publication Data
US 2013/0022076 A1  Jan. 24, 2013

(30) Foreign Application Priority Data
Feb. 25, 2010 (FR) ...................................... 10 51350

(51) Int. Cl.
*G01K 13/02* (2006.01)
(52) U.S. Cl.
CPC .............. *G01K 13/02* (2013.01); *G01K 13/028* (2013.01)
USPC ............... 374/138; 374/141; 374/208; 374/7; 374/163; 73/866.5; 73/170.12; 244/134 F
(58) Field of Classification Search
CPC .... G01K 13/02; G01K 13/028; G01P 13/025; G01P 5/165; F01P 2025/08; F01P 2025/13; F01P 2025/50

USPC ............. 374/141, 143, 147, 148, 208, 138, 7, 374/163, 135, 100, 109, 144; 73/73, 866.5, 73/170.02, 170.01, 170.05, 170.12; 244/134 R, 134 F
See application file for complete search history.

(56) References Cited

U.S. PATENT DOCUMENTS 2,916,808 A * 12/1959 Wilkes, Jr. ............... 29/889.721
2,925,250 A *  2/1960 Whitehead .................... 416/215
(Continued)

FOREIGN PATENT DOCUMENTS

EP          244334 A2 * 11/1987
EP        0 835 804 A2    4/1998
(Continued)

*Primary Examiner* — Gail Kaplan Verbitsky
(74) *Attorney, Agent, or Firm* — Blakely Sokoloff Taylor & Zafman (57) ABSTRACT

The invention concerns a device for measuring at least one physical parameter of a fluid flow, in particular the total air temperature, comprising:
  a profiled body (2) of elongate shape along a longitudinal axis (L) and having at least two walls arranged contiguous to each other at an acute angle to form a wedge-shaped portion (7), said wedge-shaped portion (7) extending in a direction parallel to the longitudinal axis (L) of the profiled body (2);
  at least one sensing element (4) for measuring the physical parameter of the fluid flow, said sensing element (4) being positioned in a window (3) formed through the profiled body (2),
characterized in that each of the walls (71; 72) forming the wedge-shaped portion (7) comprises at least one notch forming a deflector angle relative to said wall (71; 72) so as to weaken the formation of ice on the wedge-shaped portion (7).

24 Claims, 6 Drawing Sheets

(56) References Cited

U.S. PATENT DOCUMENTS

| | | | |
|---|---|---|---|
| 3,116,395 A * | 12/1963 | Byrne et al. | 219/201 |
| 4,152,938 A | 5/1979 | Danninger | |
| 4,210,021 A * | 7/1980 | Vykhodtsev et al. | 73/170.26 |
| 4,263,842 A * | 4/1981 | Moore | 454/318 |
| 4,358,075 A | 11/1982 | Antonov | |
| 4,398,688 A * | 8/1983 | Williams | 244/207 |
| 4,432,658 A * | 2/1984 | Harman et al. | 374/138 |
| 4,494,406 A * | 1/1985 | Komons et al. | 73/204.22 |
| 4,726,548 A * | 2/1988 | Clites | 244/209 |
| 4,991,976 A * | 2/1991 | Byles | 374/135 |
| 5,003,295 A * | 3/1991 | Kleven | 340/581 |
| 5,334,068 A * | 8/1994 | Davis | 446/34 |
| 5,340,301 A * | 8/1994 | Saffire et al. | 425/336 |
| 5,752,674 A | 5/1998 | Mears et al. | |
| 6,250,801 B1 * | 6/2001 | Bernard | 374/138 |
| 6,250,901 B1 * | 6/2001 | Nagata | 425/46 |
| 6,820,479 B2 * | 11/2004 | Roeckel et al. | 73/202.5 |
| 6,827,485 B2 * | 12/2004 | Isebrand | 374/141 |
| 7,014,359 B2 * | 3/2006 | Suga | 374/208 |
| 7,985,021 B2 * | 7/2011 | Bard et al. | 374/138 |
| 8,100,582 B1 * | 1/2012 | Powell | 374/138 |

FOREIGN PATENT DOCUMENTS

| | | |
|---|---|---|
| FR | 2 680 872 A1 | 3/1993 |
| FR | 2 822 230 A1 | 9/2002 |
| GB | 1029522 | 5/1966 |
| JP | 2000292267 | 10/2000 |
| JP | 2002-267544 | 9/2002 |
| JP | 2010-121985 | 6/2010 |
| WO | WO 95/08122 | 3/1995 |
| WO | WO 00/31508 | 6/2000 |
| WO | WO 0188496 A1 * | 11/2001 |
| WO | WO 03/106949 | 12/2003 |

* cited by examiner

ICE BREAKING PROBE FOR MEASURING GLOBAL AIR TEMPERATURE

This is a non-provisional application claiming the benefit of International Application Number PCT/EP2011/052701/001602 filed Feb. 23, 2011.

FIELD OF THE INVENTION

The present invention relates to a device for measuring at least one physical parameter on a flow of fluid, and more precisely to an anti-ice probe for measuring total air temperature.

It finds particularly advantageous application in the field of aeronautics for measuring the total temperature of the air at the intake to the engines and/or outside aircraft such as cruising aircraft.

STATE OF THE ART

Conventionally on an aircraft on which engines are mounted, temperature measuring devices to measure the temperature of air flows are arranged at the air inlet or close to the engine intake or on an outer surface of the aircraft.

The air on the outer surface of an aircraft forms a high speed air flow and it is necessary to measure the total temperature of this air flow. Several types of probe exist allowing the measurement of total air temperature. In particular, it is possible to use a temperature measuring device having a structure in which the total temperature is measured by reducing the flow rate of the air flowing through a passage integrating a sensing element. Said measuring device is described for example in French patent application FR 91-10845 filed by the applicant on 2 Sep. 1991 and published under reference FR 2 680 872.

However, when an aircraft is flying under frost or snow conditions, this frost and/or snow accumulates on the walls of the probe leading to the formation of ice which adheres to the walls, thereby perturbing the functioning of the probe if too much ice accumulates. In addition, should the frost and/or snow enter inside the window integrating the sensor intended to measure the air flow, ice may also form in this area which may cause measurement inaccuracies or even prevent the functioning of the sensor.

Various solutions have been put forward to overcome these malfunction problems due to the formation of ice on the probe.

One first solution consists of using measuring probes which integrate a heating mechanism provided to heat the body of the probe and thereby prevent ice from forming on the walls of said probe. While such systems are fairly efficient to prevent frost and/or snow from adhering to the body of the probe, the measurements taken by the sensing elements of the probe are generally perturbed by the heating mechanism used, which leads to imprecise measurements of parameter values and perturbs the normal functioning of the probe since data availability is made more complex through the need for compensation with different algorithms (in relation to whether or not power is fed to the probe).

Other solutions have therefore been proposed to avoid having recourse to said additional heating mechanism. For example, it was proposed in U.S. Pat. No. 5,752,674 published on 19 May 1998 to use an ice shield intended to be positioned upstream of the probe in the direction of flow of the fluid so as to promote the growth of ice on this shield rather than on the probe. The ice shield proposed in this document is of complex shape, comprising several blade-shaped portions each differing from one another, so as to create several ice-forming areas. Since ice is formed on the shield at several points, the ice pieces formed are of small size compared with a single ice formation which would form on a single blade-shaped portion, with the result that when these small ice formations break up and are released from the shield their small size means that it is possible to reduce risk of damage to parts located downstream of the probe. However, the manufacturing of said ice shield is very complex owing to its highly specific shape. In addition, multiple blade-shaped portions weaken the overall structure of the shield, all the more so since this shield is added onto the probe body thereby also weakening the assembly.

In French patent application FR 02-02967 published on 20 Sep. 2002 under reference number FR 2 822 230, a probe was proposed whose body is profiled to promote early pulling away of any ice which adheres to the walls of the probe body, so that the pieces of ice detach themselves from the probe body at a stage of growth such that they do not damage the parts located downstream of the probe. For this purpose, the proposed probe is in the shape of a blade of very particular dimensions to reduce the adhering surface of the ice onto the probe and also so that the adhesive property of the probe body is reduced. The proposed probe is therefore very thin, and is widely angled relative to the plane in which the probe is secured, which weakens the probe as such and may give rise to problems in the event of extensive use of the probe under extreme conditions.

It is therefore one objective of the present invention to propose a device for measuring a physical parameter of a fluid flow and intended to be positioned on an aircraft, which enables the probe to function under any weather conditions, in particular in the presence of frost and/or snow, without perturbing the measurements taken, and which allows the solving of at least one of the above-mentioned shortcomings.

One particular objective of the present invention is to propose an anti-ice probe of simple manufacture which has increased resistance under extreme weather conditions.

The proposed probe further allows the avoiding of any deterioration of parts located downstream of the probe relative to the direction of fluid flow, by limiting the size of the ice pieces which detach themselves from the probe body.

DISCLOSURE OF THE INVENTION

For this purpose, a device is proposed for measuring at least one physical parameter of a fluid flow, in particular the total air temperature, comprising:
  a profiled body having an elongate shape along a longitudinal axis (L), and having at least two walls arranged contiguous to each other at an acute angle to form a wedge-shaped portion, said wedge-shaped portion extending in a direction parallel to the longitudinal axis (L) of the profiled body;
  at least one sensing element to measure the physical parameter of the fluid flow, said sensing element being arranged in a window formed through the profiled body, characterized in that each of the walls forming the wedge-shaped portion comprises at least one notch forming a diverter angle relative to said wall so as to weaken the formation of ice on the wedge-shaped portion.

The notch(es) provided on the wedge-shaped portion are distinct from the through window inside which the sensing element is arranged.

Preferred but non-limiting aspects of this measuring device, taken alone or in any possible technical combination, are the following:

the profile body has symmetry relative to a median plane passing through the longitudinal axis (L), the walls forming the wedge-shaped portion comprising the same number of symmetric notches relative to said plane;

each notch is of elongate shape along a direction perpendicular to the longitudinal axis (L) of the profiled body;

each notch does not extend as far as the edge common to the two walls forming the wedge-shaped portion;

each of the walls forming the wedge-shaped portion comprises three notches, one of the notches being formed opposite the window formed through the profiled body and comprising the sensing element;

the two walls forming the wedge-shaped portion are arranged at an angle of at least 30° and preferably of between 35° and 40°;

the surfaces of the notches formed on each of the walls of the wedge-shaped portion together form an angle of at least 25° and preferably between 25° and 30°, this angle additionally being smaller than the angle formed between the walls of the wedge-shaped portion;

the profiled body extends from a fastening flange, said fastening flange having a bearing defining a securing plane for the measuring device, and wherein the window comprising the sensing element is arranged in the profiled body at the opposite end relative to the end coupled to the fastening flange;

the profiled body comprises two complementary walls extending respectively from the two walls forming the wedge-shaped portion, said two complementary walls being substantially parallel to each other and defining a main portion of the profiled body;

the window comprising the sensing element is formed through the main portion of the profiled body from one of the two complementary walls towards the other of the two complementary walls;

each of the complementary walls is arranged relative to the corresponding wall of the wedge-shaped portion so as to form a recess;

each notch extends as far as the recess formed between the walls of the wedge-shaped portion and the complementary walls of the main portion;

the profiled body comprises two other complementary walls respectively extending from the two complementary walls parallel to each other forming the main portion, said two other complementary walls also being arranged contiguous to each other at an acute angle to form a second wedge-shaped portion, said second wedge-shaped portion extending in a direction parallel to the longitudinal axis (L) of the profiled body;

the profiled body is sized on the basis of a unit of length $U_L$ along the following principles:

the walls forming the first wedge-shaped portion are identical, so that the cross-section of said first wedge-shaped portion is an isosceles triangle with a height of size between 2 $U_L$ and 4 $U_L$, preferably 3 $U_L$, and a base of size between 1 $U_L$ and 3 $U_L$, preferably 1.5 $U_L$;

the complementary walls forming the main portion are identical, so that the cross-section of said main portion is a rectangle with a length of size between 1 $U_L$ and 3 $U_L$, preferably 2 $U_L$, and a width of size between 1 $U_L$ and 1.5 $U_L$, preferably 1.2 $U_L$;

the other complementary walls forming the second wedge-shaped portion are identical so that the cross-section of said second wedge-shaped portion is an isosceles triangle with a height of size between 1 $U_L$ and 2 $U_L$, preferably 1.5 $U_L$, and a base of size between 1 $U_L$ and 1.5 $U_L$, preferably 1.2 $U_L$.

two sensing elements are arranged in the window made through the profiled body, said sensing elements having a cylindrical shape of diameter $\Phi$ and being arranged along an axis parallel to the longitudinal axis (L) of the profiled body, said sensing elements being positioned so that:

the distance between the longitudinal axes of the two sensing elements is between 1$\Phi$ and 3$\Phi$, and is preferably 2$\Phi$;

the distance between the longitudinal axis (L) of each sensing element and the base of the triangular cross-section characteristic of the first wedge-shaped portion is between 3$\Phi$ and 5$\Phi$, and is preferably 4.5$\Phi$;

the distance between the longitudinal axis (L) of each sensing element and the base of the triangular cross-section characteristic of the second wedge-shaped portion is between 2$\Phi$ and 3$\Phi$, and is preferably 2.5$\Phi$, each wall of the profiled body is substantially planar.

DESCRIPTION OF THE FIGURES

Other characteristics and advantages of the invention will become further apparent from the following description which is solely illustrative and non-limiting and is to be read in connection with the appended drawings in which.

DETAILED DESCRIPTION OF THE INVENTION

Figure 1:
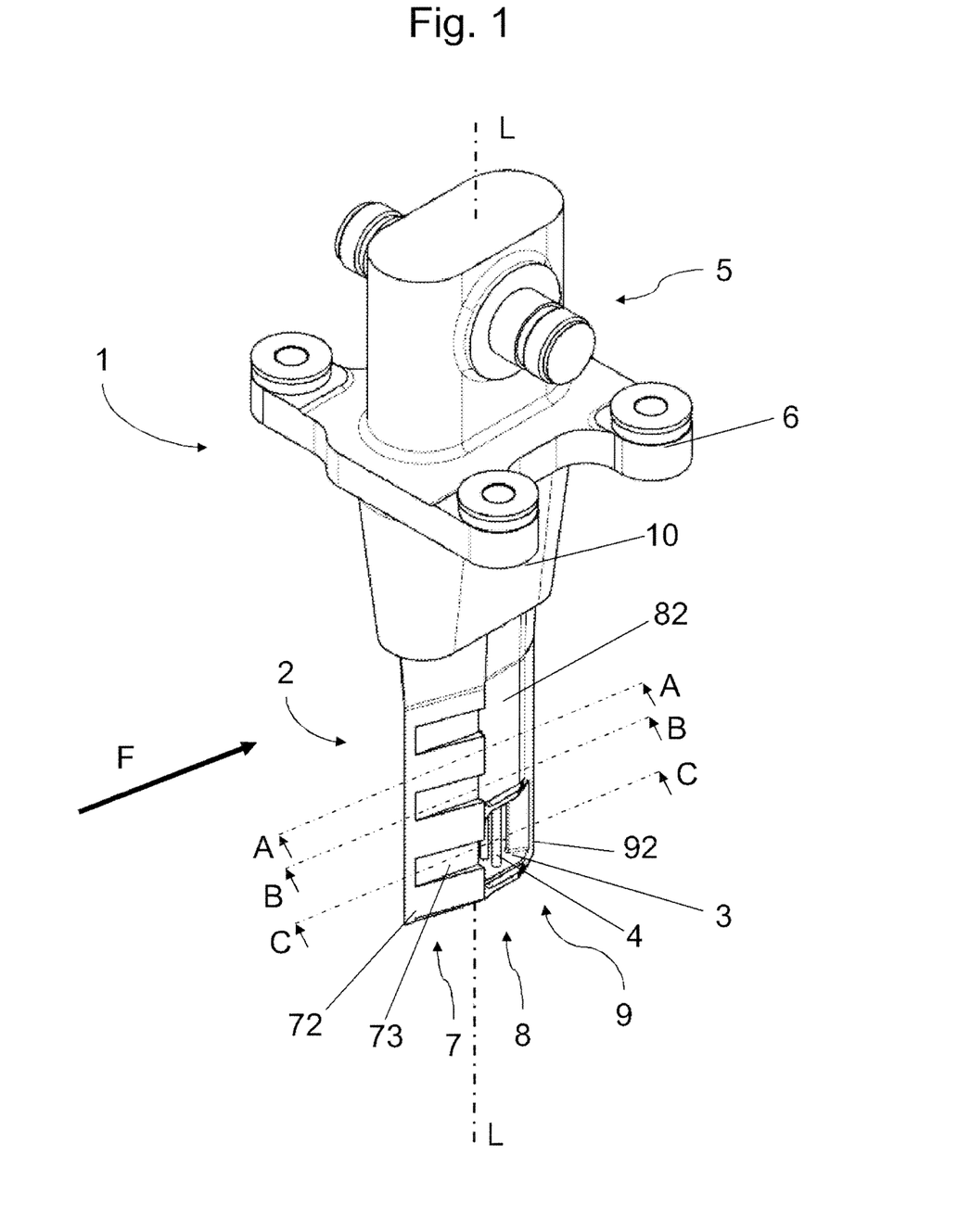
FIG. 1 is a three-dimensional view of an anti-ice probe according to a first embodiment of the invention.
Figure 2:
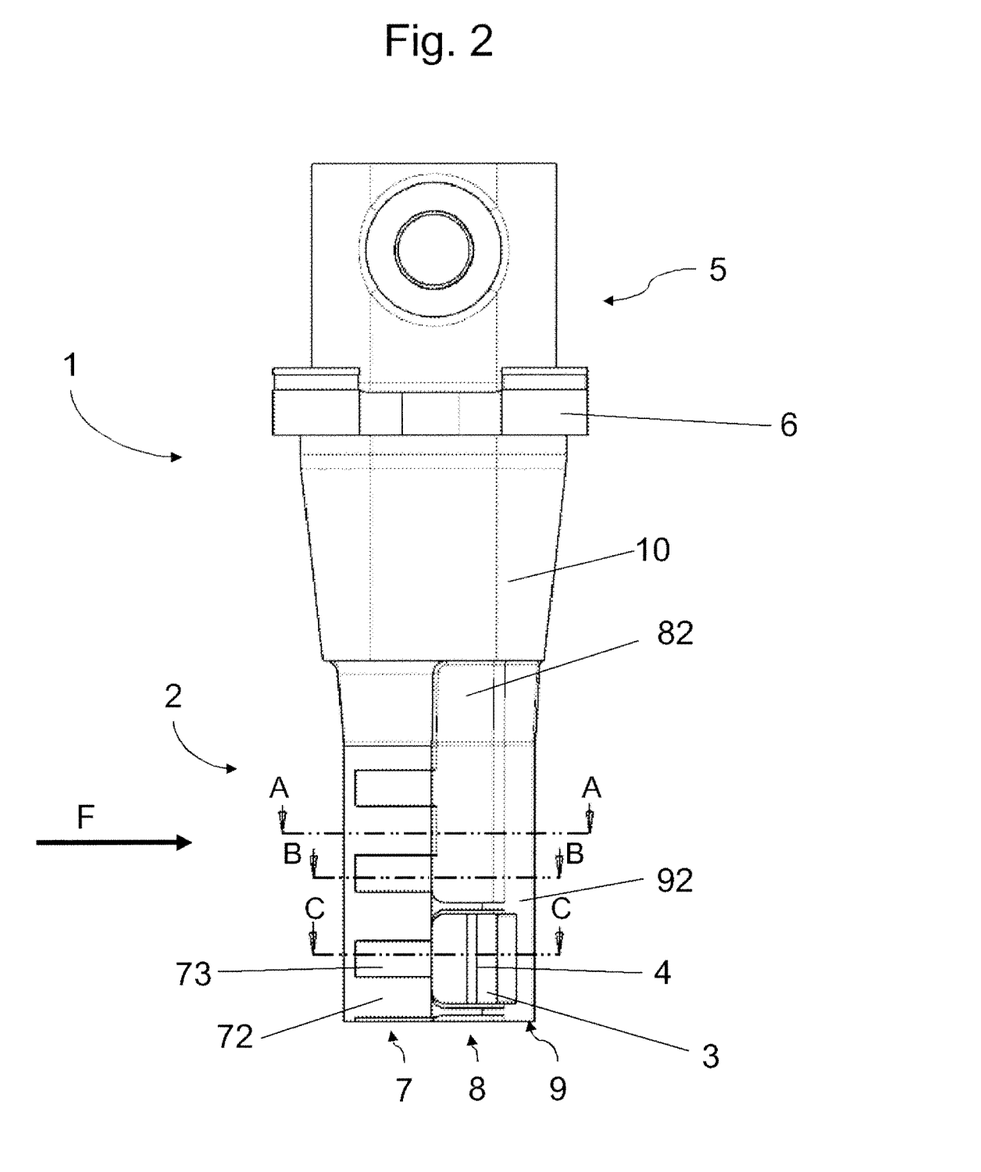
FIG. 2 is a side view of the anti-ice probe in FIG. 1.

FIGS. 1 and 2 are perspective and side views respectively of an anti-ice probe 1 for measuring physical parameters of a fluid flow illustrated by the arrow F.

The anti-ice probe 1 comprises a profiled body 2 of substantially elongate shape along a longitudinal axis L.

As can be seen in FIGS. 1 and 2, a through window 3 is formed through the profiled body 2 to allow the flowing of a flow to be measured, this flow being sampled on a fluid flow F between an inlet orifice and an outlet orifice of said window 3, each orifice being located on opposite faces of the profiled body 2. The window 3 therefore forms a through duct between the two walls of the profiled body 2 of the probe. This window 3 formed through the probe body 2 allows the positioning of one or more sensors 4 to measure physical parameters of the fluid flow such as the measurement of temperature for example. Therefore provision may be made for any sensor element known to the person skilled in the art which is of cylindrical elongate shape for example, arranged in the window 3 so as to position the axis of the sensing element 4 substantially parallel to the longitudinal axis L characterizing the elongate shape of the probe body 2.

Preferably, the anti-ice probe 1 further comprises a fastening flange 5 from which the profiled body 2 of the probe 1 extends. This fastening flange 5 comprises a bearing 6 allowing said anti-ice probe 1 to be secured onto a wall of an aircraft for example, so as to arrange the probe body 2 in a longitudinal direction substantially perpendicular to the direction of fluid flow F.

In addition to the presence of a through window 3 allowing the positioning of the sensing elements 4 to measure physical parameters characterizing the fluid, the profiled body 2 is of particular shape to prevent the ice formation from perturbing the measurements taken by the sensing element(s) 4 and also to prevent ice formed on the probe 1, when it detaches from the profiled body 2, from damaging parts of the aircraft located downstream of the probe 1 relative to the direction of fluid flow F.

Therefore, the profiled body 2 comprises a wedge-shaped portion 7 ahead of the probe i.e. it is intended to be placed upstream in the direction of flow of the fluid F. This wedge-shaped portion 7 can therefore be called a front wedge-shaped portion.

More specifically, the profiled body 2 comprises two walls 71 and 72 arranged relative to one another so as to have a contiguous edge and to form an acute angle, this particular arrangement of the walls thereby forming the wedge-shaped portion 7 of the profiled body 2. The edge contiguous to these two walls 71 and 72 is preferably arranged in a direction parallel to the longitudinal axis L of the profiled body 2 so that the wedge-shaped portion 7 is substantially perpendicular to the bearing 6 of the fastening flange 5 from which the profiled body 2 of the probe 1 extends.

The acute angle between the two walls 71 and 72 (corresponding to the angle formed by the two walls along the transverse plane of the probe perpendicular to the longitudinal axis of the profiled body) is chosen so that any frost and/or snow carried by the fluid flow F comes to adhere to said walls 71 and 72 forming the wedge-shaped portion 7 and more particularly at the pointed tip of this wedge-shaped portion 7. Therefore an angle of more 30° is chosen and preferably of between 35° and 40°.

According to the invention, the wedge-shaped portion 7 of the profiled body 2 of the probe 1 also comprises a plurality of notches 73 cut on each of the walls 71 and 72. Each notch 73 forms a cut-out made on the surface of each of the walls 71 and 72. Therefore the notches 73 are not through notches passing through the probe body; they are surface cut-outs made on the walls 71 and 72. As will be seen below, the purpose of these notches is to weaken ice forming on the walls 71 and 72 of the wedge-shaped portion 7 so that the ice mass becomes fragile promoting early breaking thereof into a plurality of small pieces of sufficiently small size so that they do not cause damage to parts located downstream of the probe 1.

The notches 73 formed in the walls 71 and 72 of the wedge-shaped portion 7 may have various shapes and positions, provided that they allow ice formation that is initially homogeneous on the tip of each wedge-shaped portion 7 i.e. at the edge common to the walls 71 and 72, followed by different growth of this ice formation depending on whether it is formed on a notched part of the wedge-shaped portion 7 or on a non-notched part of the wedge-shaped portion 7.

Preferably, the notches are formed symmetrically on each of the walls 71 and 72 so that the formation and weakening of the ice mass also occurs symmetrically when the fluid flow F strikes the front part of the probe 1 in uniform manner i.e. in a direction perpendicular to the front plane of the probe 1 passing through its longitudinal axis L.

Preferably the notches 73 are in the form of grooves extending in a direction perpendicular to the longitudinal axis L of the profiled body 2 of the probe 1. Further preferably, these grooves are planar.

The grooves 73 formed on each of the walls 71 and 72 preferably form between them an angle smaller than the acute angle formed between the walls 71 and 72 of the wedge-shaped portion (angles along the transverse plane of the probe perpendicular to the longitudinal axis of the profiled body). For example, it is possible to choose an angle of more than 30° between the grooves 73 of each of the walls 71 and 72.

The notches 73 formed in the walls 71 and 72 of the profiled body 2 do not extend as far as the contiguous edge common to said walls 71 and 72. Therefore the wedge-shaped portion 7 comprises a front part (in relation to the direction of fluid flow F) which is identical over the entire height of the wedge-shaped portion 7.

In addition to the wedge-shaped portion 7 located ahead of the probe body 2 in relation to the direction of fluid flow F, the profiled body 2 comprises a main portion 8 through which the window 3 is formed allowing the positioning of the sensing elements 4 to measure physical parameters of the fluid flow. It follows clearly from this arrangement that the notches 73 are distinct from the window 3 passing through the profiled body 2.

Figure 3A:
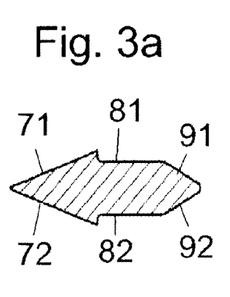
FIGS. 3a, 3b, and 3c are cross-sectional views of the anti-ice probe in FIG. 1 along lines A-A, B-B, and C-C respectively.
Figure 3B:
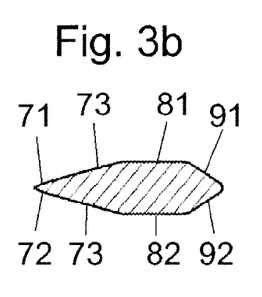
Figure 3C:
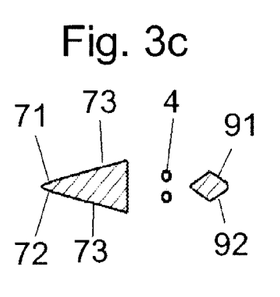

The shape of this main portion 8 may be any shape but is preferably formed by two walls 81 and 82 parallel to each other and parallel to the longitudinal axis of the profiled body 2 as is illustrated in FIGS. 1 and 2, and in FIGS. 3a to 3c giving cross-sectional views of the profiled body 2 in FIG. 1 along different sectional planes.

Preferably, the walls 81 and 82 forming the main portion 8 of the profiled body 2 extend from the walls 71 and 72 of the wedge-shaped portion 7 so as to form a recess relative to these walls 71 and 72.

The use of notches 73 on the front wedge-shaped portion 7 of the probe therefore allows the weakening of ice forming on said walls and promotes the breaking away of the ice from said probe. On this account, it is not necessary for the probe to comprise a heating mechanism to heat the probe body for the melting of accumulated ice. Therefore, preferably the proposed anti-ice probe does not comprise any specific heating mechanism to melt ice.

The profiled body 2 of the probe 1 may also comprise an aft wedge-shaped portion 9 i.e. placed at the opposite end of the probe 1 relative to the wedge-shaped portion 7 in the direction of the fluid flow F.

This second wedge-shaped portion 9 is also formed by two walls 91 and 92 together forming an acute angle, these walls extending from the walls 81 and 82 forming the main portion 8. The walls 91 and 92 forming the second wedge-shaped portion 9 preferably lie in the continuation of the walls 81 and 82 of the main portion 8 so that no recess is formed between the main portion 8 and the second wedge-shaped portion 9 of the profiled body 2 of the probe 1.

The profiled body 2 of the probe 1 may extend directly from the bearing 6 of the fastening flange 5. It may also be provided on an intermediate portion 10 which lengthens the profiled body 2 of the probe so as to offset the sensing element 4 from the securing plane of the probe 1. This intermediate portion 10 also allows strengthening of the global structure of the probe 1, in particular for the fixing of the profiled body 2 onto the fastening flange 5.

Figure 4A:
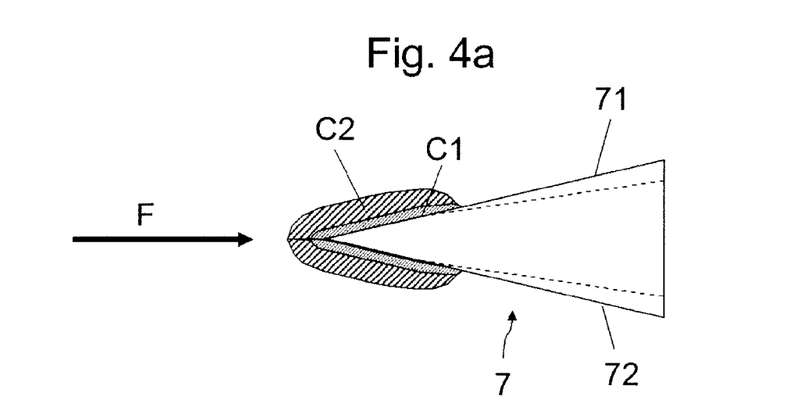
FIGS. 4a and 4b are cross-sectional views schematically illustrating the formation of ice on the blade portion of the anti-ice probe in FIG. 1.
Figure 4B:
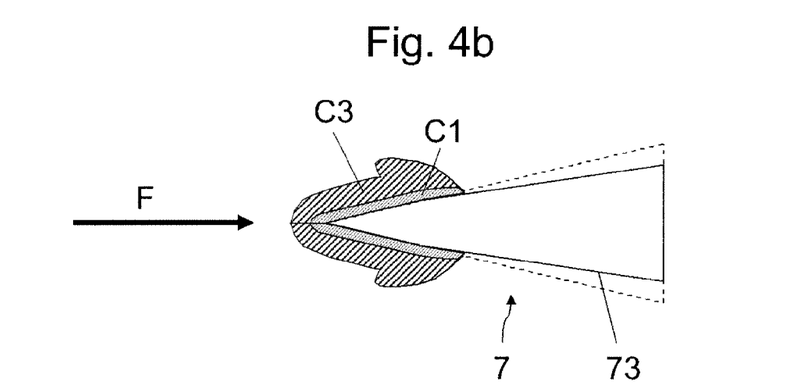

FIGS. 4a and 4b schematically illustrate the forming of ice on the wedge-shaped portion 7 when the fluid flow F strikes the profiled body 2 of the probe 1 frontally i.e. in a direction perpendicular to the frontal plane of the probe 1 passing through its longitudinal axis L. More specifically, FIG. 4a illustrates the formation of ice on the wedge-shaped portion 7 at a part of the walls 71 and 72 not comprising any notch, whilst the schematic in FIG. 4b illustrates the forming of ice on the wedge-shaped portion 7 at a part of the walls 71 and 72 comprising a notch 73.

When the anti-ice probe 1 comes to lie in a fluid flow F comprising frost and/or snow, these elements come to adhere onto the walls 71 and 72 of the wedge-shaped element 7 at the tip of the wedge-shaped element. The wedge-shaped element 7 is formed so that its forward part i.e. the front pointed tip relative to the profiled body 2 of the probe 1, is of identical shape over its entire height; the notches 73 provided on the walls 71 and 72 effectively do not extend as far as the pointed tip of the wedge-shaped portion 7. In this manner, the initial formation of ice on the wedge-shaped portion 7 occurs uniformly over its entire height, whether or not the tip lies opposite notches 73. The ice layer initially formed on the wedge-shaped portion 7 is illustrated in FIGS. 4a and 4b and is referenced C1.

Once the initial layer of ice C1 has been formed on the front pointed part of the wedge-shaped portion 7, the ice continues to grow from this base layer covering the pointed tip of the wedge-shaped portion 7. However, contrary to the depositing of the first initial layer C1 of ice on the wedge-shaped portion 7, the subsequent growth of the ice on this initial ice layer C1 takes place differently depending on whether it occurs at a part of the wedge-shaped portion 7 not comprising a notch or at a part of the wedge-shaped portion 7 comprising notches 73.

As is illustrated in FIG. 4a, when the ice grows on a part of the wedge-shaped portion 7 not comprising any notch, then the growth of the ice occurs in substantially homogeneous manner over the entire surface of the initial layer of ice C1. Therefore a layer C2 of ice is formed in relatively homogeneous manner on the initial ice layer C1 adhering to the tip of the wedge-shaped portion 7 of the profiled body 2 of the probe 1. As is illustrated in FIG. 4b, the growth of the ice at a part of the wedge-shaped portion 7 which does comprise notches 73 is different; this being perturbed by the diverter angle formed by said notch 73 in relation to the walls 71 and 72. The layer C3 of ice formed at a part which has notches 73 therefore has a different profile from the ice layer C2 formed at a part of the wedge-shaped portion 7 that is devoid of a notch.

Therefore the growth of the ice on the initial layer C1 takes place differently depending on whether it occurs at a part of the wedge-shaped portion 7 comprising notches 73 or at a part of the wedge-shaped portion 7 not comprising any notches, so that the ice being formed along the wedge-shaped portion 7 is weakened as and when it grows through the presence of the notches 73 in the wedge-shaped portion 7. In addition, the differences noted in ice growth such as illustrated in FIGS. 4a and 4b are increasingly more marked as and when the ice grows on the wedge-shaped portion 7 no that the gradual weakening of the ice forming on the wedge-shaped portion 7 leads to early breakage of the ice formation on the wedge-shaped portion 7, and subsequently to the detaching of ice pieces, this detachment being helped by the fluid flow impacting on the ice and setting up imbalances.

Therefore, the particular design presented for the profiled body 2 comprising a front wedge-shaped portion 7 with walls 71 and 72 provided with notches 73 promotes the non-homogeneous growth of ice on said wedge-shaped portion 7, thereby weakening the ice formed along the wedge-shaped portion 7 which promotes early breaking of the ice formation into ice pieces of small size which have the advantage of not damaging the parts located downstream of the anti-ice probe 1.

Depending on frost conditions, and in particular when the temperature is not too low (slightly negative temperature, in general higher than −5° C.), the ice layer C1 initially formed on the pointed tip of the wedge-shaped portion 7 may have a tendency to remain fixed to the walls of the wedge-shaped portion 7, including at the time when the upper ice layers break away from the wedge-shaped portion 7 and are expelled downstream of the anti-ice probe 1. The particular design of the probe allows this ice layer C1 to remain very thin at all times, therefore not modifying the dimensional equilibrium of the probe and making it possible to avoid perturbed measurements of air flow temperature. In particular, the dimensions of this ice layer C1 lead to a negligible modification of the probe profile with respect to recovery error (the recovery error being related to the geometric shape of the probe and its capability of converting kinetic energy to molecular translational energy).

Additionally, this ice layer C1 whether it has re-formed after the ice has been fully detached or whether it has remained clinging to the wedge-shaped portion, is used as base for the subsequent growth of new ice on the wedge-shaped portion 7 following the same mechanism of growth as mentioned above, namely non-homogeneous growth according to whether it occurs at a part of the wedge-shaped portion 7 comprising notches 73 or at a part of the wedge-shaped portion not comprising any such notches.

The fact that the angle formed by the walls 71 and 72 of the wedge-shaped portion 7 located ahead of the probe 1 is relatively large (preferably greater than 30° and further preferably between 35° and 40°) means that it possible to protect the sensors 4 measuring physical parameters of the fluid flow since the large angle formed by these walls diverts the ice pieces which have just become detached from the wedge-shaped portion 7 outwardly away from the profiled body 2 of the probe 1. With this particular profile of the wedge-shaped portion 7 it is effectively possible to prevent ice pieces detached from the wedge-shaped portion 7 from surging into the window 3 where the measuring sensors 4 are located which would perturb the functioning thereof and even cause damage thereto.

In the embodiment illustrated in FIGS. 1 and 2, a notch 73 is placed opposite the through window 3 inside which the sensors 4 are positioned. This has the advantage that it promotes the weakening of the ice forming on the wedge-shaped portion 7 at the level of the through window 3, so that the ice pieces which detach from the wedge-shaped portion 7 at the level of the through window 3 will be of particularly small size. Therefore, if despite the particular profile of the wedge-shaped portion 7 intended to divert detached ice pieces away from this wedge-shaped portion 7, some ice pieces should nevertheless enter inside the through window 3, the fact that these ice pieces are of small size reduces the risk of damaging the measuring sensors 4.

The number of notches 73 formed on the wedge-shaped portion 7 and their relative positioning along the walls of the wedge-shaped portion 7 may vary. The embodiment illustrated in FIGS. 1 and 2 forms an optimal embodiment for the anti-ice probe in which each wall 71 and 72 comprises three notches 73 in the form of grooves, distributed regularly along the wedge-shaped portion 7, thereby multiplying the weakening regions of the ice being formed on this wedge-shaped portion 7 and hence promoting the formation of as many ice pieces of small size. In addition, as just indicated, one of these notches 73 is positioned opposite the through the window 3 formed in the profiled body 2 of the probe 1 to integrate measuring sensors 4, which makes it possible to reduce the risk of damage to these sensing elements 4 by ice pieces which might pass through the window 3 despite the flared profile of the wedge-shaped portion 7.

Figure 5:
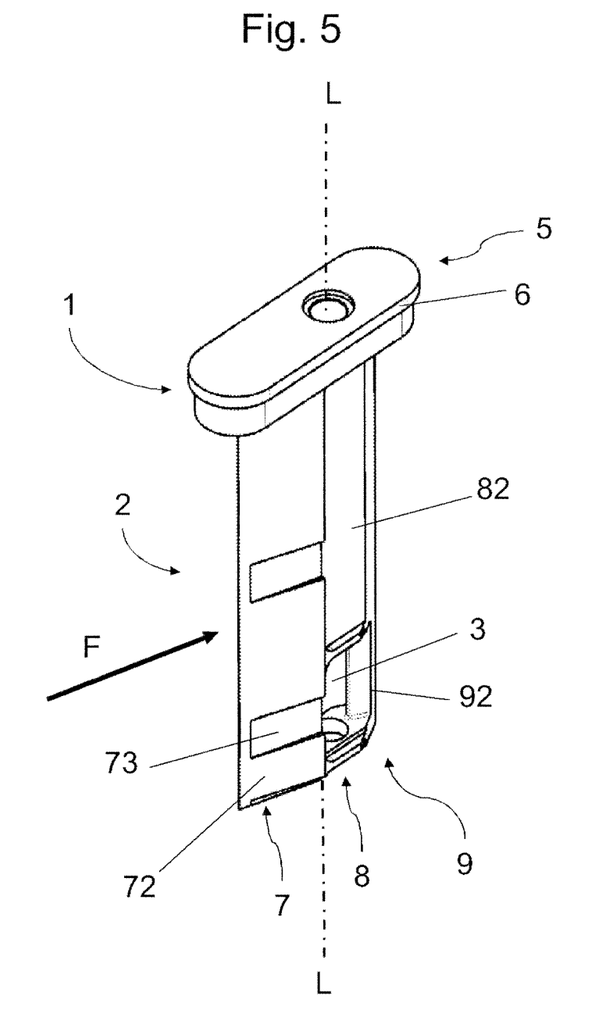
FIG. 5 is a three-dimensional view of an anti-ice probe according to a second embodiment of the invention.
Figure 6:
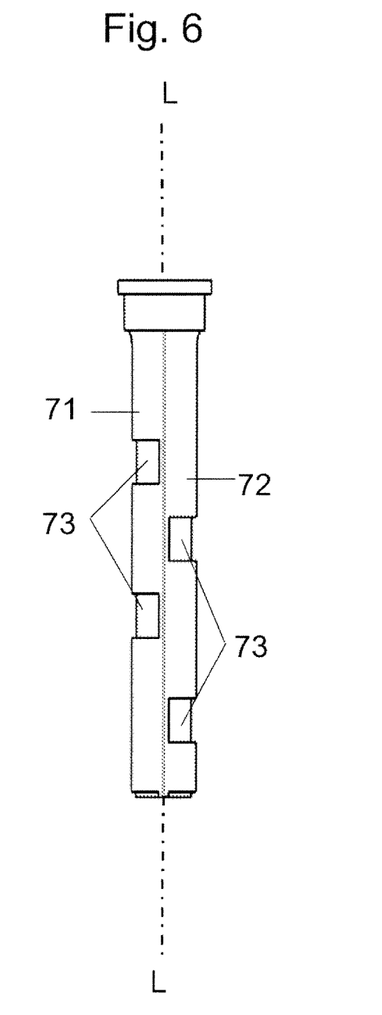
FIG. 6 is a front view of the anti-ice probe in FIG. 5.

It is possible however to envisage other designs for the wedge-shaped portion 7 located ahead of the anti-ice probe 1. In particular, FIGS. 5 and 6 illustrate an embodiment in which two notches 73 are provided on each wall (71; 72), these notches being in the form of grooves placed at different positions along the wedge-shaped portion 7. Preferably as illustrated in FIG. 6, the notches 73 provided on the first wall 71 are offset from the notches provided on the second wall 72, which promotes the non-homogenous growth of ice and hence early breaking up thereof.

Figure 7:
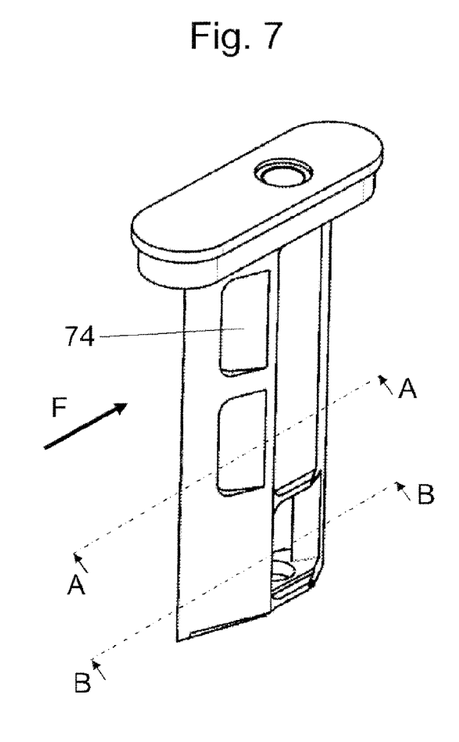
FIG. 7 is a three-dimensional view of an anti-ice probe according to a third embodiment of the invention.
Figure 8A:
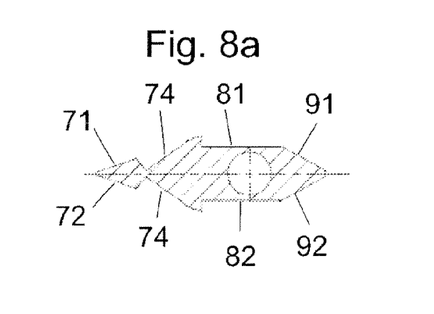
FIGS. 8a and 8b are cross-sectional views of the anti-ice probe in FIG. 7 along lines A-A, and B-B respectively.
Figure 8B:
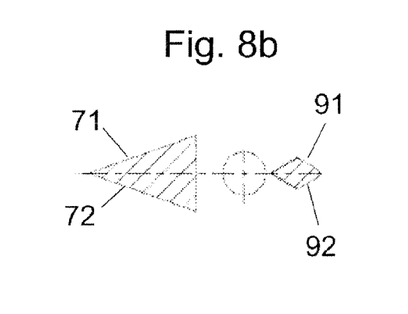

The embodiment illustrated in FIGS. 7, 8*a* and 8*b* also comprises two notches 74 distributed in particular manner along the wedge-shaped portion 7. However, the notches 74 illustrated in this embodiment are not grooves but more complex cut-outs of substantially elongate shape along the longitudinal axis L of the profiled body 2.

Figure 9:
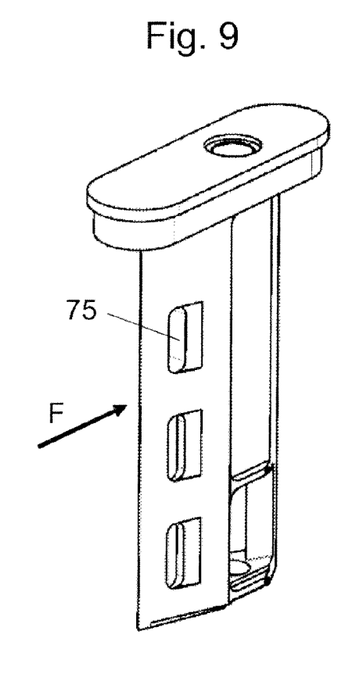
FIG. 9 is a three-dimensional view of an anti-ice probe according to a fourth embodiment of the invention.

According to yet another different embodiment of the probe, such as illustrated in FIG. 9, notches 75 are provided also in the form of elongate cut-outs along the longitudinal axis L of the profiled body, with the difference that these cut-outs are of smaller size than those in the embodiment in FIG. 7, in particular with regard to the dimension along the longitudinal axis L. In this case, as illustrated in FIG. 9, it is preferable to provide for a greater number of notches along the profiled body, for example three notches, arranging one notch 75 opposite the window 3 intended to receive the sensing elements 4.

The sizing of the anti-ice probe 1 can be optimized so that it is operational under any functioning conditions. For this purpose, it is important that the shape of the probe should prevent any element other than the fluid flow F to be measured from entering inside the through window 3 comprising the sensing elements which measure physical parameters of the fluid flow. In particular, this will allow the anti-ice probe to operate under conditions of frost, snow or rain without these particles entering inside the through window 3. Preferably, each wall forming the probe body 2 is substantially planar.

Figure 10:
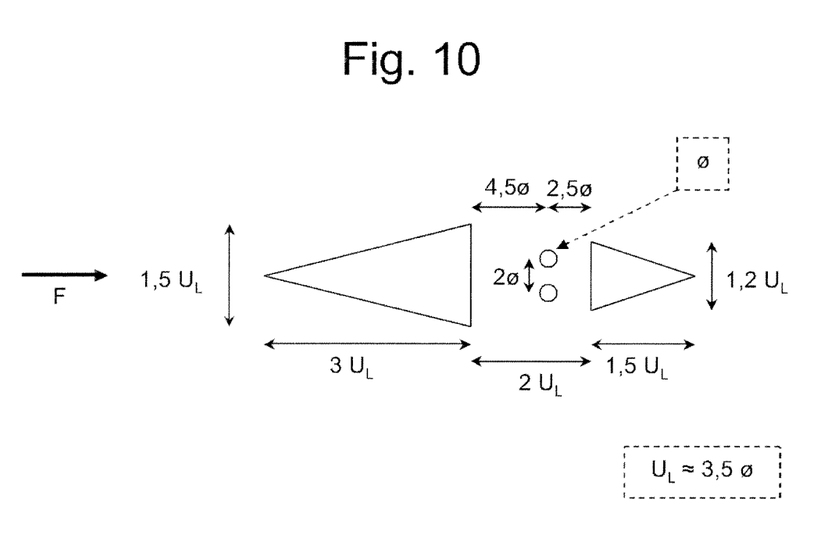
FIG. 10 is a schematic illustration of the sizing of an anti-ice probe according to the invention.

The probe 1 can therefore be sized using the sizing rules below and for which FIG. 10 illustrates the optimal sizing.

The profiled body 2 is sized on the basis of a unit of length $U_L$ along the following principles (by the expression <<x $U_L$>>, is meant <<x times the length $U_L$>>):

the walls forming the first wedge-shaped portion 7 are identical, so that the cross-section (section along the transverse plane of the profiled body 2 perpendicular to the longitudinal axis L) of said first wedge-shaped portion 7 is an isosceles triangle with a height of size between 2 $U_L$ and 4 $U_L$, preferably 3 $U_L$, and a base of size between 1 $U_L$ and 2 $U_L$, preferably 1.5 $U_L$;

the complementary walls forming the main portion 8 are identical so that the cross-section (section along the transverse plane of the profiled body 2 perpendicular to the longitudinal axis L) of said main portion 8 is a rectangle with a length of size between 1 $U_L$ and 2 $U_L$, preferably 2 $U_L$, and a width of size between 1 $U_L$ and 1.5 $U_L$, preferably 1.2 $U_L$;

the other complementary walls forming the second wedge-shaped portion 9 are identical, so that the cross section (section along the transverse plane of the profiled body 2 perpendicular to the longitudinal axis L) of said second wedge-shaped portion 9 is an isosceles triangle with a height of size of between 1 $U_L$ and 2 $U_L$, preferably 1.5 $U_L$, and a base of size between 1 $U_L$ and 1.5 $U_L$, preferably 1.2 $U_L$.

Also, if the probe comprises two sensing elements 4 positioned in the window 3 formed through the profiled body 2, said sensing elements 4 having a cylindrical shape of diameter $\Phi$ and being arranged along an axis parallel to the longitudinal axis L of the profiled body 2, it is preferable that these sensing elements 4 should be positioned so that (by the expression <<x$\Phi$>>, is meant <<x times the diameter $\Phi$>>):

the distance between the longitudinal axes of the two sensing elements 4 is between 1$\Phi$ and 3$\Phi$, and is preferably 2$\Phi$;

the distance between the longitudinal axis of each sensing element 4 and the base of the triangular cross-section characteristic of the first wedge-shaped portion 7 is between 3$\Phi$ and 5$\Phi$, and is preferably 4.5$\Phi$;

the distance between the longitudinal axis of each sensing element 4 and the base of the triangular cross-section characteristic of the second wedge-shaped portion 9 is between 2$\Phi$ and 4$\Phi$, and is preferably 2.5$\Phi$.

In this case, it is preferable that the ratio between the diameter $\Phi$ of the sensing element 4 and the unit of length $U_L$ used to size the profiled body 2 is such that the ratio between the unit of length $U_L$ and the diameter $\Phi$ is between 3 and 4, and is preferably $U_L \approx 3.5 \cdot \Phi$).

The invention claimed is:

1. A device for measuring at least one physical parameter of a fluid flow, comprising:
   a profiled body (2) having an elongate shape along a longitudinal axis (L), and having at least two walls arranged contiguous to each other at an acute angle to form a wedge-shaped portion (7), said wedge-shaped portion (7) extending in a direction parallel to the longitudinal axis (L) of the profiled body (2);
   at least one sensing element (4) to measure the physical parameter of the fluid flow, said sensing element (4) being arranged in a window (3) formed through the profiled body (2), wherein each of the walls (71; 72) forming the wedge-shaped portion (7) comprises at least two notches distinct from the window (3) said notches forming a deflector angle relative to said wall (71; 72) to weaken the formation of ice on the wedge-shaped portion (7).

2. The device of claim 1, wherein the profiled body (2) has a symmetry relative to a median plane passing through the longitudinal axis (L).

3. The device of claim 1, wherein each notch has an elongate shape in a direction perpendicular to the longitudinal axis (L) of the profiled body (2).

4. The device of claim 1, wherein each notch does not extend as far as the edge common to the two walls (71; 72) forming the wedge-shaped portion (7).

5. The device of claim 1, wherein each of the walls (71; 72) forming the wedge-shaped portion (7) comprises three notches, one of the notches being formed opposite the window (3) formed through the profiled body (2) and comprising the sensing element (4).

6. The device of claim 1, wherein the two walls (71; 72) forming the wedge-shaped portion (7) are arranged at an angle of at least 30°.

7. The device of claim 1, wherein the surfaces of the notches formed on each of the walls (71; 72) of the wedge-shaped portion (7) together form an angle of at least 25°, which is smaller than said acute angle formed between the walls (71; 72) of the wedge-shaped portion (7).

8. The device of claim 1, wherein the profiled body (2) extends from a fastening flange (5), said fastening flange (5) having a bearing (6) defining a plane for securing the measuring device, and wherein the window (3) comprising the sensing element (4) is formed in the profiled body (2) at the opposite end relative to the end coupled to the fastening flange (5).

9. The device of claim 1, wherein the profiled body (2) comprises two complementary walls (81; 82) respectively extending from the two walls (71; 72) forming the wedge-shaped portion (7), said complementary walls (81; 82) being substantially parallel to each other and defining a main portion (8) of the profiled body (2).

10. The device of claim 9, wherein the window (3) comprising the sensing element (4) is formed through the main portion (8) of the profiled body (2) from one of the two complementary walls (81; 82) towards the other of the two complementary walls (81; 82).

11. The device of claim 9, wherein each of the complementary walls (81; 82) is arranged relative to the corresponding wall of the wedge-shaped portion (7) so as to forma recess.

12. The device of claim 11, wherein each notch extends as far as the recess formed between the walls (71; 72) of the wedge-shaped portion (7) and the complementary walls (81; 82) of the main portion (8).

13. The device of claim 9, wherein the profiled body (2) comprises two other complementary walls (91; 92) respectively extending from the two complementary walls (81; 82) parallel to each other and forming the main portion (8), said two other complementary walls (91; 92) being arranged contiguous to one another at an acute angle to form a second wedge-shaped portion (9), said second wedge-shaped portion (9) extending in a direction parallel to the longitudinal axis (L) of the profiled body (2).

14. The device of claim 13, wherein the profiled body (2) is sized on the basis of a unit of length $U_L$, and:
the walls (71; 72) forming the first wedge-shaped portion (7) are identical so that the cross-section of said first wedge-shaped portion (7) is an isosceles triangle with a height of size between 2 $U_L$ and 4 $U_L$, and a base of size between 1 $U_L$ and 3 $U_L$;
the complementary walls (81; 82) forming the main portion (8) are identical so that the cross-section of said main portion (8) is a rectangle with a length of size between 1 $U_L$ and 3 $U_L$, and a width of size between 1 $U_L$ and 1.5 $U_L$;
the other complementary walls (91; 92) forming the second wedge-shaped portion (9) are identical so that the cross-section of said second wedge-shaped portion (9) is an isosceles triangle with a height of size between 1 and 2 $U_L$, and a base of size between 1 $U_L$ and 1.5 $U_L$.

15. The device of claim 13, wherein two sensing elements (4) are arranged in the window (3) formed through the profiled body (2), said sensing elements (4) having a cylindrical shape of diameter $\Phi$ and being arranged along an axis parallel to the longitudinal axis (L) of the profiled body (2), said sensing elements (4) being positioned so that:
the distance between the longitudinal axes of the two sensing elements (4) is between 1$\Phi$ and 3$\Phi$,
the distance between the longitudinal axis (L) of each sensing element (4) and the base of the triangular cross-section characteristic of the first wedge-shaped portion (7) is between 3$\Phi$ and 5$\Phi$;
the distance between the longitudinal axis (L) of each sensing element (4) and the base of the triangular cross-section characteristic of the second wedge-shaped portion (9) is between 2$\Phi$ and 3$\Phi$.

16. The device of claim 1, wherein each wall of the profiled body substantially planar.

17. The device of claim 14, wherein two sensing elements (4) are arranged in the window (3) formed through the profiled body (2), said sensing elements (4) having a cylindrical shape of diameter $\Phi$ and being arranged along an axis parallel to the longitudinal axis (L) of the profiled body (2), said sensing elements (4) being positioned so that:
the distance between the longitudinal axes of the two sensing elements (4) is between 1$\Phi$ and 3$\Phi$;
the distance between the longitudinal axis (L) of each sensing element (4) and the base of the triangular cross-section characteristic of the first wedge-shaped portion (7) is between 3$\Phi$ and 5$\Phi$;
the distance between the longitudinal axis (L) of each sensing element (4) and the base of the triangular cross-section characteristic of the second wedge-shaped portion (9) is between 2$\Phi$ and 3$\Phi$.

18. The device of claim 1, wherein the two walls (71; 72) forming the wedge-shaped portion (7) are arranged at an angle of between 35° and 40°.

19. The device of claim 1, wherein the surfaces of the notches formed on each of the walls (71; 72) of the wedge-shaped portion (7) together form an angle of between 25° and 30°, this angle being smaller than the angle formed between the walls (71; 72) of the wedge-shaped portion (7).

20. The device of claim 13, wherein the profiled body (2) is sized on the basis of a unit of length $U_L$ along the following principles:
the walls (71; 72) forming the first wedge-shaped portion (7) are identical so that the cross-section of said first wedge-shaped portion (7) is an isosceles triangle with a height of size 3 $U_L$, and a base of size 1.5 $U_L$;
the complementary walls (81; 82) forming the main portion (8) are identical so that the cross-section of said main portion (8) is a rectangle with a length of size 2 $U_L$, and a width of size 1.2 $U_L$;
the other complementary walls (91; 92) forming the second wedge-shaped portion (9) are identical so that the cross-section of said second wedge-shaped portion (9) is an isosceles triangle with a height of size 1.5 $U_L$, and a base of size 1.2 $U_L$.

21. The device of claim 13, wherein two sensing elements (4) are arranged in the window (3) formed through the profiled body (2), said sensing elements (4) having a cylindrical shape of diameter $\Phi$ and being arranged along an axis parallel to the longitudinal axis (L) of the profiled body (2), said sensing elements (4) being positioned so that:
the distance between the longitudinal axes of the two sensing elements (4) is 2$\Phi$,
the distance between the longitudinal axis (L) of each sensing element (4) and the base of the triangular cross-section characteristic of the first wedge-shaped portion (7) is 4.5$\Phi$;
the distance between the longitudinal axis (L) of each sensing element (4) and the base of the triangular cross-section characteristic of the second wedge-shaped portion (9) is 2.5$\Phi$.

22. The device of claim 14, wherein two sensing elements (4) are arranged in the window (3) formed through the profiled body (2), said sensing elements (4) having a cylindrical shape of diameter $\Phi$ and being arranged along an axis parallel to the longitudinal axis (L) of the profiled body (2), said sensing elements (4) being positioned so that:
the distance between the longitudinal axes of the two sensing elements (4) is 2$\Phi$;

the distance between the longitudinal axis (L) of each sensing element (4) and the base of the triangular cross-section characteristic of the first wedge-shaped portion (7) is 4.5Φ;

the distance between the longitudinal axis (L) of each sensing element (4) and the base of the triangular cross-section characteristic of the second wedge-shaped portion (9) is 2.5Φ.

23. The device of claim 1 configured for measuring total air temperature.

24. A device for measuring total air temperature, comprising:

a profiled body (2) having an elongate shape along a longitudinal axis (L), and having at least two walls arranged contiguous to each other at an acute angle to form a wedge-shaped portion (7), said wedge-shaped portion (7) extending in a direction parallel to the longitudinal axis (L) of the profiled body (2);

at least one sensing element (4) to measure temperature of the fluid flow, said sensing element (4) being arranged in a window (3) formed through the profiled body (2), wherein each of the walls (71; 72) forming the wedge-shaped portion (7) comprises three notches distinct from the window (3), said notches forming a deflector angle relative to said all (71; 72) to weaken the formation of ice on the wedge-shaped portion (7), one of the notches being formed opposite the window (3) formed through the profiled body (2) and comprising the sensing element (4).

* * * * *

UNITED STATES PATENT AND TRADEMARK OFFICE
CERTIFICATE OF CORRECTION

PATENT NO. : 8,864,370 B2
APPLICATION NO. : 13/580960
DATED : October 21, 2014
INVENTOR(S) : Sebastien Dijon, David Lapeyronnie and Bruno Lhuillier It is certified that error appears in the above-identified patent and that said Letters Patent is hereby corrected as shown below:

In the Claims,

Column 11, Claim 11, line 21, please delete "forma" and insert --form a--.

Column 11, Claim 14, line 50, please delete "1" and insert --1 $U_L$--.

Column 12, Claim 16, line 2, please delete "body substantially" and insert --body (2) is substantially--.

Column 13, Claim 24, line 24, please delete "all" and insert --wall--.

Signed and Sealed this
Twenty-eighth Day of April, 2015

Michelle K. Lee
*Director of the United States Patent and Trademark Office*